CONVERSATION TIMING CONTROLLED IN LINEFINDERS AND REPEATERS

Filed Jan. 11, 1950 3 Sheets-Sheet 1

INVENTOR.
CLARENCE E. LOMAX
BY Chas. W. Candy
ATTORNEY

CONVERSATION TIMING CONTROLLED IN LINEFINDERS AND REPEATERS

Filed Jan. 11, 1950 3 Sheets-Sheet 2

INVENTOR.
CLARENCE E. LOMAX
BY
ATTORNEY

CONVERSATION TIMING CONTROLLED IN LINEFINDERS AND REPEATERS

Filed Jan. 11, 1950 3 Sheets-Sheet 3

INVENTOR.
CLARENCE E. LOMAX

BY Chas. W. Candy

ATTORNEY

Patented Sept. 15, 1953 2,652,455

UNITED STATES PATENT OFFICE 2,652,455

CONVERSATION TIMING CONTROLLED IN LINEFINDERS AND REPEATERS

Clarence E. Lomax, Chicago, Ill., assignor to Automatic Electric Laboratories, Inc., Chicago, Ill., a corporation of Delaware Application January 11, 1950, Serial No. 138,009

17 Claims. (Cl. 179—18)

Figure 1:
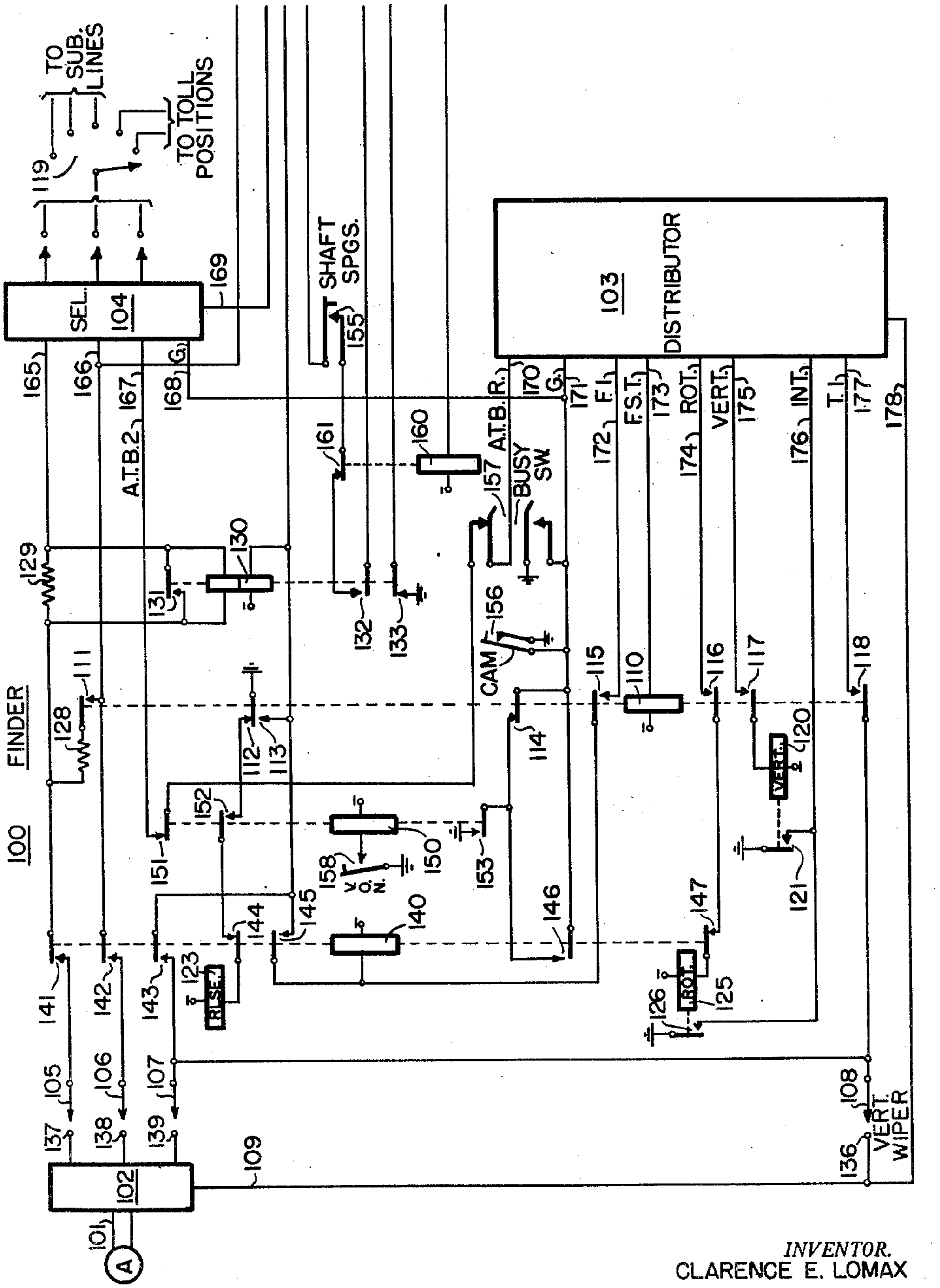

This invention relates in general to telephone systems and more particularly to telephone systems which utilize conversation timing of established telephone connections, the connection being automatically disconnected a certain interval of time after it was first established.

The number of switches required in an automatic telephone exchange to give proper service is determined by the number of calls made during the busy hour or hours and the length of time the connection is held during this period. The generally accepted formula is that one eighth of the total twenty-four hour daily load is carried during the one busiest hour of the day. If the length of time of the calls during the busy periods could be shortened, a greater number of calls could be completed over the same number of switches and also certain subscribers would be induced to make their calls during non-busy hours so as to have unlimited conversation time, the combined result being a substantial reduction in the number of switches required to give proper service when no periodic conversation timing is employed. It should be realized that it would not be advisable to subject certain calls, such as calls from business establishments, to conversation timing at any time of the day and the same applies to toll calls made from any subscriber including those subscribers normally affected by conversation timing.

It might also be considered an advantage to subject inter-office connections established from certain lines to conversation timing while intra-office connections established from the same lines would not have conversation timing.

It would also be advantageous to provide that the conversation timing equipment be under the control of an operator under various circumstances or that it be responsive to actual traffic conditions of the system occurring during the day. It is with these foregoing facts in mind that this invention was conceived.

One object of this invention is to provide conversation timing with automatic disconnect, controlled in linefinders or in inter-office repeaters, of telephone connections established by certain of the subscribers having access to the linefinder or repeater, the timing equipment to be operative only during normally busy periods of the day and arranged so that it will continue to operate once it has started even though the normally busy period of the day should end before the connection is automatically interrupted.

Another object of this invention is to provide conversation timing with automatic disconnect, controlled in linefinders or in inter-office repeaters, of telephone connections established by certain of the subscribers having access to the linefinder or repeater, the timing equipment to be controlled by the traffic conditions of the system so as to be operative during all actually busy periods of the day or under the control of an operator so as to be operative at the discretion of the operator.

Another object of this invention is to provide conversation timing equipment which is operative only during normally busy periods of the day and then only when an operator desires to render it operative.

Another object of this invention is to provide conversation timing equipment for use in disconnecting established telephone connections which is operative during the normally busy or peak load periods of the day in all instances and may be rendered operative by an operator at any other time of the day the operator may choose.

Still another object of this invention is to provide conversation timing equipment which will operate to time a call during normally busy or peak load periods of the day but cease operating shortly before the connection would normally be interrupted if the conditions of the system indicate light traffic, the timing equipment re-operating to mark the short time remaining and quickly interrupt the connection if the traffic should suddenly become heavy or if an operator should desire the connection interrupted for any reason.

Still another object of this invention is to provide a telephone system wherein inter-office connections established by way of a linefinder-repeater system from certain lines accessible from the linefinder willl be subject to conversation timing while connections established from the other lines accessible from the linefinder will not have conversation timing, the conversation timing equipment being located in the repeater circuit so that all intra-office connections established through the finder from any of the lines accessible therefrom will not have conversation timing.

One feature of this invention is the provision, in a linefinder or repeater circuit, of a stepping switch or first timer which is operated in response to impulses received from an impulse sender device to cause automatic interruption of an established connection through the linefinder or repeater after a certain number of impulses have been received by the first timer, the first or initiating impulse being sent to the first timer in response to the operation of a second timer, which is operated automatically during normally peak load periods of the day, the first timer device causing the remainder of the impulses to be transmitted to it independent of the second timer device to thereby cause the first timer to remain operated after the second timer device has released.

Another feature of this invention is the provision, in a system as described in the above feature, of a second timer device which is operated automatically only during normally peak load periods of the day, the first timer thereby remaining operated even after the normally peak load period of the day is passed.

Another feature of this invention is the provision, in a system as described in the first-mentioned feature, of a second timer device which operates during all actual heavy load periods of the day or which can be controlled by an operator so as to be operated when she desires.

Another feature of this invention is the provision, in a system as described in the first-mentioned feature, of a second timer device which will operate only during normal peak load periods of the day and then only when an operator has conditioned it to operate at such time.

Another feature of this invention is the provision, in a system such as described in the first-mentioned feature, of a second timer device which will automatically operate during certain fixed normally peak load period in all instances and may also be controlled by an operator to operate during any other period the operator may select.

Another feature of this invention is the provision, in a system such as described in the first-mentioned feature, of a second timer device which will operate during a normally peak load period to cause the initial impulse to be sent to the first timer switch and a circuit means which will operate shortly before the last of the impulses are transmitted to stop the transmitting of impulses to the first timer in case there is a light traffic load, thereby holding the conversation timing equipment in abeyance until heavy traffic conditions or an act of an operator causes the second timer to operate to disable the circuit means and thereby cause the last few impulses to be transmitted to the first timer switch to cause it to quickly time out and interrupt the connection.

Still another feature of this invention is the provision of a repeater circuit having associated therewith conversation timing equipment designed to interrupt a connection established therethrough, the connection including a finder circuit which will signal the repeater to render the conversation timing equipment operative on connections established from certain of the lines accessible from the finder but will not signal the repeater thereby leaving the timing equipment in a disabled state on connections established from other lines accessible from the finder.

The invention will appear more clearly, and further objects will become apparent, from the following detailed description when taken in connection with the accompanying drawings, showing by way of example, a preferred embodiment of the inventive idea.

Figs. 1, 2, 2A to 2F inclusive, and 3 depict a telephone system which best illustrates the present invention, a system similar in some respects to the telephone system shown in the co-pending application of C. E. Lomax, Serial No. 136,922, filed January 5, 1950, entitled Conversation Timing in Automatic Telephone Systems, this present disclosure showing a number of control circuits associated with the conversation timer for enabling and disabling it at various times and under various conditions.

More specifically, Fig. 1 illustrates a linefinder circuit 100 and associated distributor 103 and selector 104, all of the well known Strowger type, for enabling a subscriber such as at substation A to complete intra-office or inter-office connections.

Figure 3:
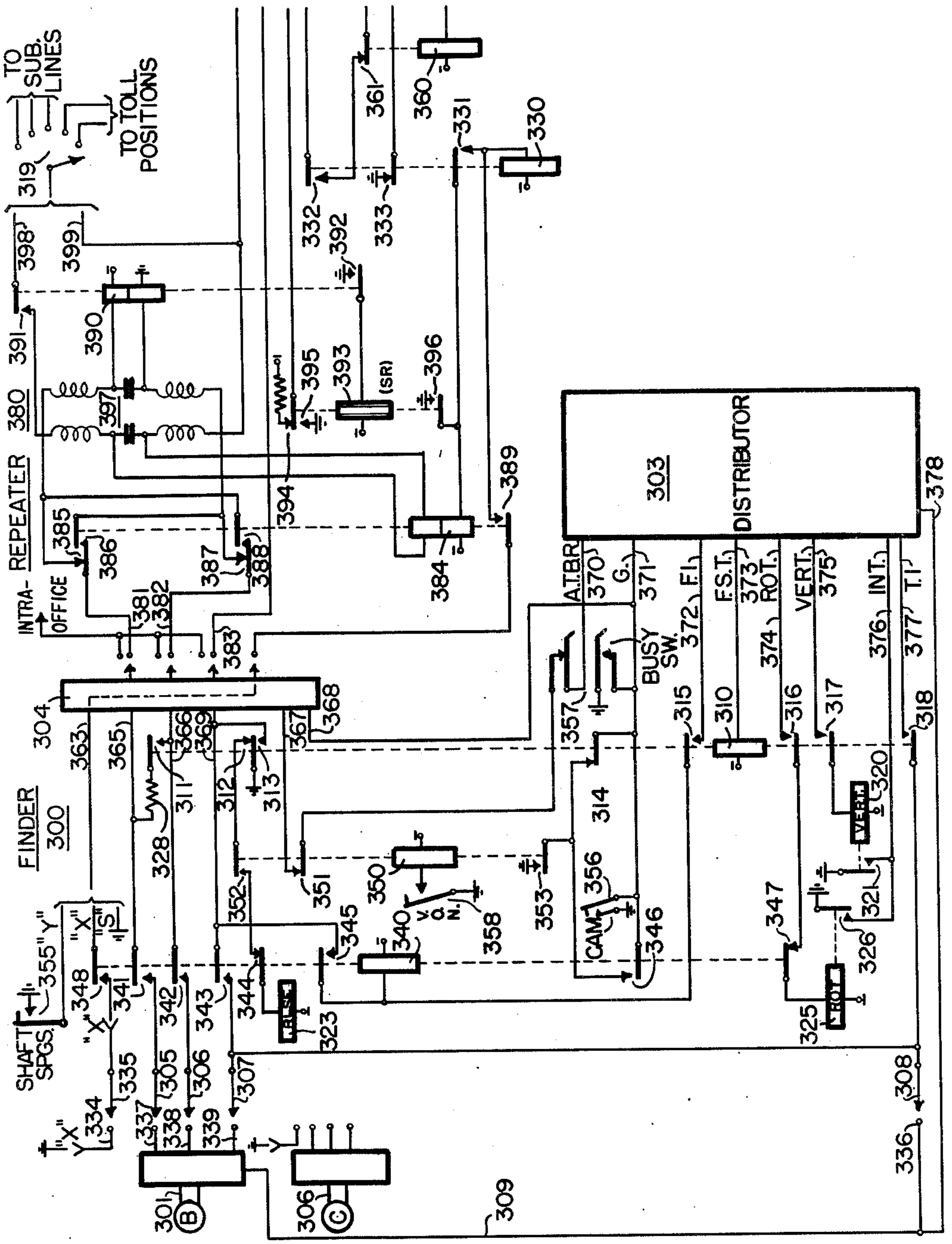

Fig. 3 illustrates a linefinder circuit and associated selector and distributor and a repeater circuit, all of the well known Strowger type, for enabling a subscriber to complete inter-office connections.

Figures 2, 2A, 2B, 2C, 2D, 2E, 2F:
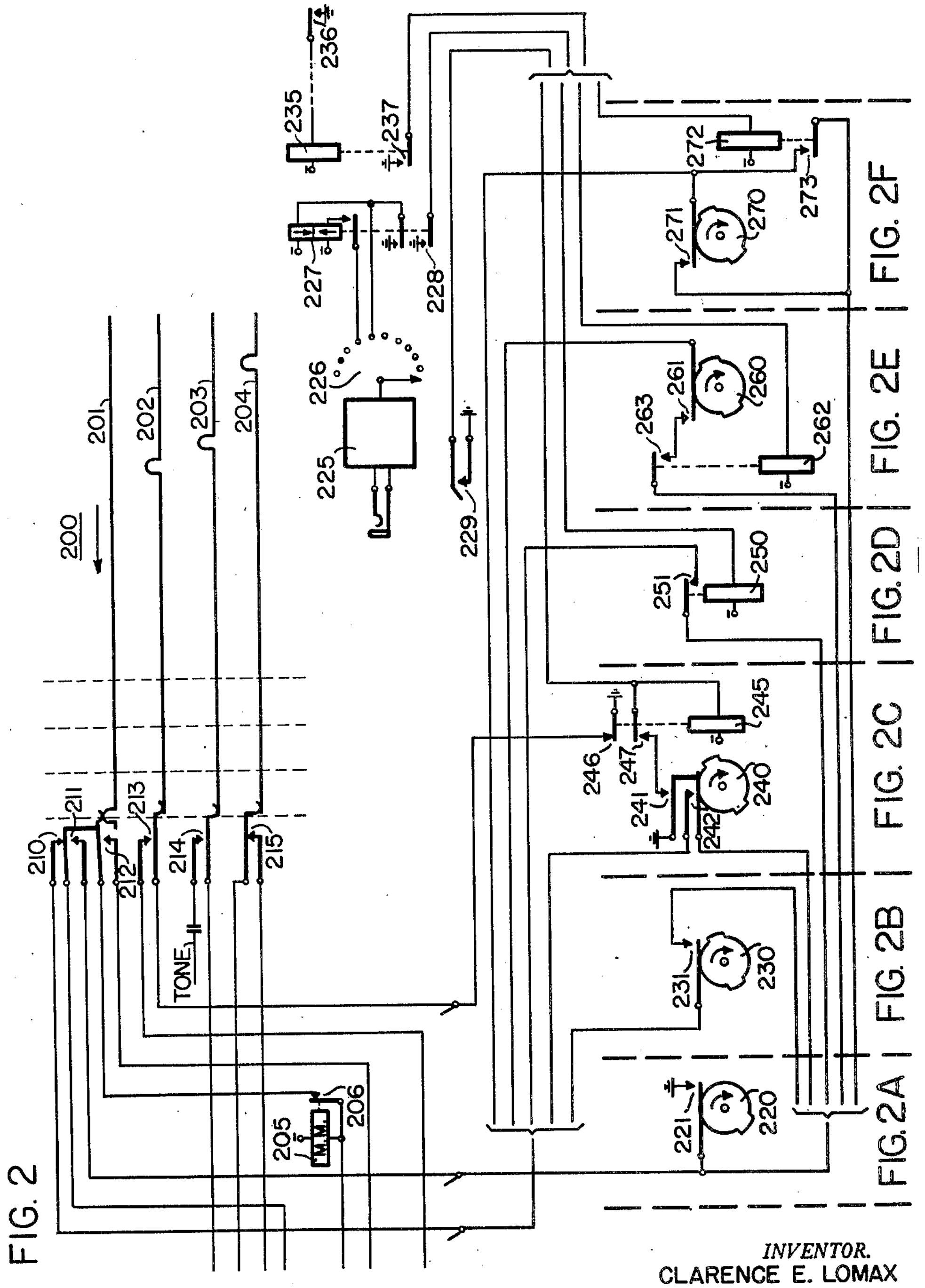

Fig. 2 illustrates a first timer switch or stepping switch 200 and associated stepping magnet 205 and impulse transmitting cam 220 used to time the connections established through the circuits of Fig. 1 or 3, the first timer switch 200 being controlled in various ways by one of the plurality of second timer devices shown in Figs. 2B to 2F, inclusive. Switch train 225 and key 228 are means for giving an operator, whether local or distant, control of certain of the second timer devices. Relay 235 is a means of controlling the timing devices responsive to the actual present traffic conditions of the exchange.

Referring now to Figs. 1 and 2, when the subscriber at the calling substation A initiates a call over the line 101, the line circuit 102 operates to connect battery potential to the control conductor 139 to mark the rotary position of line 101 in the bank of the finder switch 100, and grounds control conductor 109 to thereby cause ground potential to be applied to the start conductor 178 extending to the distributor 103, and to also cause the ground potential to mark in the vertical bank of the finder switch, the level wherein line 101 is terminated, the vertical contact being indicated at 136.

The ground closed to the control conductor 109 and thus to the start conductor 178 initiates operation of the distributor 103, thereby to cause this preselected idle finder 100 to be assigned to the use of the calling subscriber line 101. The distributor 103, as well as distributor 303 of Fig. 3, is similar to and operates in the same manner as that shown in the Patent 2,214,908 of Lomax and Baker, September 17, 1940 and reference may be had to this patent for a more detailed understanding. A line circuit similar to 301 and 306 is also shown in the above patent. More particularly, distributor 103 operates to place ground potential on finder start conductor 173 and ground potential on vertical conductor 175. Ground potential on conductor 173 causes start relay 110 to operate. Relay 110 on operating closes a path between line conductors 165 and 166 by way of contacts 111 and resistance 128 to seize the selector circuit 104, closes the circuit from the rotary magnet 125 to the distributor 103 by way of contacts 147 and 116 and rotary conductor 174, and closes the circuit from vertical conductor 175 to the finder vertical magnet 120 through contacts 117. Operation of relay 110 also closes ground at contacts 113 to energize the lower or polar winding of the well known electro-polar relay 130, this electro-polar relay being designed so that it will not operate on its lower or polar winding alone and so remaining unoperated at this time. On seizing selector 104, ground potential is found standing on line conductor 165 and battery potential on line conductor 166 in the selector, thus completing an energizing circuit to the upper or operating winding of electro-polar relay 130 in parallel with resistance 129. The operating or upper winding of relay 130 when connected to battery potential in such a manner produces a magnetic polarity which opposes that produced by the polar or lower winding and relay 130 will remain unoperated. On operating after seizure, the selector 104 connects ground to control conducttr 169 for the purpose of holding the finder 100 under control of the selector 104 when subsequent release of relay 110 removes the ground from conductor 169 at contacts 113, as will hereinafter be explained.

The ground potential on the vertical conductor 175 causes the vertical magnet 120 to operate to step the Strowger switch mechanism one step in the vertical direction and to connect, at contacts 121, ground to interrupter conductor 176. The ground connected to interrupter conductor 176 causes the distributor 103 to operate to remove the ground from vertical conductor 175 to cause the vertical magnet 120 to restore, removing the ground at contacts 121 from conductor 176. The removal of ground from conductor 176 causes the distributor 103 to operate to reconnect ground to vertical conductor 175 to again cause the vertical magnet 120 to operate to step the Strowger switch mechanism an additional step in the vertical direction and to reconnect ground to conductor 176 by way of contacts 121. The above cycle of operations is continued, the vertical magnet 120 and the distributor 103 interacting, to step the switch mechanism in a vertical direction until the vertical wiper 108 engages the contact in the vertical bank associated therewith having marking ground potential thereon. In the present instance, the vertical wiper 108 engages contact 136 having the marking ground potential thereon. This ground on conductor 109 from the line circuit 102 is closed through bank contact 136 and wiper 108 to the distributor 103 by way of contacts 118 and test conductor 177. This ground on test conductor 177 causes the distributor 103 to operate to remove the ground from vertical conductor 175 so that the vertical magnet 120 will restore and also to connect ground on rotary conductor 174.

It is noted that when the switch mechanism of the finder 100 is operated away from its normal position by the first operation of the vertical magnet 120, the vertical off-normal switch springs 158, are actuated. On closing, the V. O. N. springs 158 cause operation of relay 150. Relay 150 on operating closes a point in the incomplete circuit to the release magnet 123 at contacts 152, opens a point at contacts 151 in the all trunks busy conductor 167, which was grounded in the selector 104, to give an all trunks busy signal if this was the last idle finder in the group associated with distributor 103, and closes a part of the circuit from ground to the guard conductor 171 at contacts 153.

The ground on rotary conductor 174 from the distributor 103 is closed to the rotary magnet 125 by way of contacts 116 and 147. When energized over the above traced circuit, the rotary magnet 125 operates to step the Strowger switch mechanism of the finder switch 100 one step in the rotary direction and to connect, at contacts 126, ground to interrupter conductor 176. This ground on conductor 176 causes the distributor 103 to operate to disconnect the ground from rotary conductor 174 to thereby cause the rotary magnet 125 to restore. Upon restoring, the rotary magnet 125 removes ground, at contacts 126, from interrupter conductor 176 to cause the distributor 103 to operate to reconnect ground to rotary conductor 174 and thus reenergize the winding of the rotary magnet 125. The rotary magnet 125 operates to cause the switch mechanism to take an additional step in the rotary direction and to reconnect ground to interrupter conductor 176. The rotary magnet 125 and distributor 103 continue to interact in the manner described above until the switch mechanism is rotated to the position of the contact set terminating the calling subscriber line 101, at which time the wiper 107 of the wiper set engages the contact terminating the control conductor 139 of line 101, whereupon a circuit is completed from battery through the well known B. C. O. relay (not shown) in the line circuit 102 to the distributor 103 by way of control conductor 139, wiper 107, contacts 118, and first test conductor 177. The distributor 103 operates to open the circuit to the rotary magnet 125 over rotary conductor 174 and closes ground to the conductor 172. Ground on the conductor 172 closes the circuit to switching relay 140 by way of contacts 115. Relay 140 operates, opens a further point in the circuit to the rotary magnet 125 at contacts 147, and closes a holding circuit to itself from ground by way of contacts 145 and 113. Upon operating, switching relay 140 also closes line conductors 105 and 106 to the selector circuit 104 at contacts 141 and 142, respectively, line conductor 105 being closed through the upper winding of electro-polar relay 130 in parallel with resistance 129. Also, control conductor 139 is closed to ground at contacts 113 through contacts 143, thus causing operation of the B. C. O. relay (not shown) in the line circuit 102 in a well known manner. Also, upon operating, relay 140 opens a part of the incomplete circuit to the release magnet 123 at contacts 144 and closes ground to the distributor 103 over guard conductor 171 through contacts 153 and 146. This ground closed to the guard conductor 171 causes the release of the distributor 103 which then operates to locate the next idle finder circuit available to the distributor in accordance with the preselecting feature of this line finder system and also marks this finder busy to the distributor 103 during subsequent selecting operations of the distributor 103 while searching for idle finders in the same group of finders.

Upon the release of the distributor 103, ground is removed from start conductor 173 in the distributor 103 and relay 110 restores, interrupting the first-mentioned path between line conductors 165 and 166 at contacts 111, closing an alternate path at contacts 114 for applying the busy marking ground potential to guard conductor 171 from ground at contacts 153, and interrupting points in the circuits to the vertical magnet 120 and rotary magnet 125 at contacts 117 and 116, respectively. Relay 110 on restoring also removes ground at contacts 113 from the conductor 169 and at this time relay 140 is held operated and the lower winding of relay 130 held energized by ground on the conductor 169 from the selector circuit 104, the selector circuit 104 in turn being held under control of the subscriber substation A over the line loop in a well known manner.

At this time the distributor 103 is completely released and the selector 104 rendered operative in response to impulses from the calling subscriber substation A to establish a connection to a called subscriber substation or a toll position over a switch train represented by switch 119 in a well known manner, the connection being either an intra-office or inter-office connection.

Fig. 2 shows a stepping mechanism 200 comprising four cams 201 to 204 inclusive which may be fixedly mounted on a common shaft driven by a mechanism controlled by the motor magnet 205. Each time the motor magnet operates and restores, the cams move one step, one step being illustrated by the distance between the vertical dotted lines. The cams 201 to 204 inclusive are arranged to operate their associated cam springs in spaced relationship. The stepping mechanism 200 has a normal position which the mechanism assumes when the finder switch is idle or no conversation timing is taking place, the mechanism being shown in its normal position in Fig. 2. Figs. 2A to 2F inclusive illustrate a plurality of common timer devices consisting of cam devices or relays or a combination of both. Cam 220 in Fig. 2A is a continuously rotating cam driven by a synchronous motor or the like (not shown) which rotates about once every ten seconds. It closes its cam springs 221 once every revolution for a short period of time. Cams 230, 240, 260 and 170 of Figs. 2B, 2C, 2E and 2F, respectively, are also continuously rotating cams but they rotate once every twenty-four hours. The cams are driven by a single synchronous motor (not shown) or may be individually driven. They cause operation of their cam springs twice every twenty-four hours, the cams being replaceable so that any periods of the day may be chosen to close the cam springs. For the purpose of this invention, these cams were designed to close their associated cam springs during the two busiest telephone traffic periods of the day. The relays 245, 250, 262 and 272 of Figs. 2C, 2D, 2E and 2F, respectively, are controlled by a distant operator over the control switch 226 or by a local operator over manual key 229 or are controlled automatically by relay 235 which responds to traffic conditions in the exchange. It should be noted that any of the above controlling means may be employed by the proper wiring of the relays 245, 250, 262 and 272 to the different control circuits.

The finder switch 100 may be connected with any one of the timer devices of Figs. 2B, 2C, 2D, 2E or 2F in conjunction with the timer device of Fig. 2A. A similar finder in the same system may be connected with a different one of the timer devices than this finder 100.

Assuming the call was to a subscriber line, when the called party answers the call, battery potential is reversed on the line conductors 165 and 166 in a well known manner, thus reversing the magnetic polarity produced by the operating or upper winding of electro-polar relay 130. The two magnetic polarities of relay 130 now aid each other and relay 130 will operate. On operating, relay 130 shorts its upper winding and resistance 129 to clear the transmission path at contacts 131, opens a point in the self-interrupting circuit to the motor magnet 205 at contacts 133, and closes a point in the operating circuit to the motor magnet 205 at contacts 132. Relay 130 will hold operated on its lower winding once it has been fully operated.

This system is arranged to provide periodic conversation timing to certain subscribers' lines, other subscriber lines not having this feature. The method employed here is somewhat similar to that disclosed in the above mentioned copending application in that discrimination between the two groups is made on the basis of switch bank levels, shaft springs 155 being arranged to close on those levels of the contact bank which terminate subscribers' lines having the conversation timing and to remain open on levels of the contact bank which terminate subscribers' lines which do not have the conversation timing feature. Assuming that substation A has conversation timing, the shaft springs 155 will be operated and when relay 130 operates on answer by the called party, a circuit is closed, at contacts 132, to the motor magnet 205 from cam springs 231, 242, 261 or 271 or relay springs 251, depending on which figure of Figs. 2B to 2F, inclusive, the finder 100 has been connected to, through contacts 161, shaft springs 155, and cam springs 210 in their normally closed position.

Assume for the present that this finder 100 is connected with the timer device of Fig. 2B in conjunction with the timer device of Fig. 2A. Thus the circuit of motor magnet 205 will be closed over the above traced circuit through cam springs 210 to cam springs 231 of cam 230. If the call through the finder 100 is being made during one of the normally heavy traffic periods of the day, even though the traffic may actually be light, the cam springs 231 will be closed. Within ten seconds after contacts 132 close the circuit to the motor magnet 205, cam 220 of Fig. 2A closes cam springs 221 to close ground to motor magnet 205 by way of cam springs 231. Motor magnet 205 operates. The stepping mechanism 200 is so designed that the cams will take one step each time the motor magnet releases. Shortly after closing ground to operate motor magnet 205, cam 220 causes cam springs 221 to open to cause motor magnet 205 to restore, thus causing the stepping mechanism 200 to take one step. On taking this first step from its normal position, cam springs 210 are opened and cam springs 211 and 212 closed. The original impulsing circuit from cam springs 221 is transferred from cam springs 231 and cam springs 210 directly through cam springs 211. This feature provides for continued conversation timing once it has started even though the normally busy time period may end and cam springs 231 open during the progress of the call. Cam 220 continues to periodically close and open cam springs 221 to cause the motor magnet 205 to operate and release to thereby step the cams 201 to 204, inclusive. When using Fig. 2B, it is not necessary to provide cam 202 or relay 160 in the finder. The stepping mechanism 200 continues to step under control of cams 220, cam 203 closing cam springs 214 a fixed period after the stepping of mechanism 200 commenced to cause a warning tone to be closed to the line conductor 166 to warn the calling and called parties that they are about to be disconnected. A short period later cam 204 causes cam springs 215 to open thus opening the circuit to relay 140 and the lower winding of relay 130 and to the B. C. O. relay in the line circuit 102 which restores, the line circuit returning to normal. Both relays 130 and 140 restore. Relay 130, on restoring, opens the circuit from cam springs 221 of cam 220 to the motor magnet 205 at contacts 132 and closes the self-interrupting circuit to motor magnet 205 through contacts 206 and cam springs 212 at contacts 133. Motor magnet 205 operates in an apparent self-interrupting manner until the mechanism 200 returns to its normal position and opens the self-interrupting circuit at cam springs 212. Relay 140 on restoring closes the circuit at contacts 144 to the release magnet 123 which operates to return the finder switch mechanism to normal. When the switch mechanism returns to normal, the V. O. N. springs 158 restore, opening relay 150. Relay 150 restores, closes a point in the all trunks busy chain at contacts 151, opens the circuit to the release magnet 123 which restores, and removes ground from the guard conductor 171 to mark the finder circuit as idle to the distributor 103. The first selector 104 also retains ground on conductor 168 to hold the finder marked busy to the distributor until the first selector is completely restored and prepared to receive subsequent calls. It will be noted that the finder can be seized before the stepping mechanism of timer 200 has been restored to normal but this is not thought objectionable because the timer will continue to restore itself even though the trunk is seized. However, cam 201 could have been made to ground conductor 171 so long as the timer is off-normal.

If the called and calling parties should release before the allowed conversation time has elapsed, the finder will release and the mechanism 200 will return to normal in a manner similar to that described above. On release by the parties, the subsequent switch train removes ground from control conductor 169 to release relays 130 and 140, release of relay 130 closing the self-interrupting circuit to the motor magnet 205. Subsequent operations follow as described above.

Assuming the call had been to a toll position rather than to a subscriber's line, the subsequent switch train would not reverse battery potential on the line conductors when the toll operator answered the call as is well known in the art. Under these circumstances, the electropolar relay 130 will never operate to start the conversation timing equipment in motion and the toll call will be allowed to continue uninterrupted at any time of the day.

Also, if the call had been established during a normally non-busy period of the day and continued into a normally busy period of the day, the conversation timing equipment would commence to operate at the beginning of the normally busy period and the conversation time period would be figured from that point of time.

If the finder 100 had been connected with Fig. 2C in conjunction with Fig. 2A rather than Fig. 2B in conjunction with 2A, the conversation timing feature would be different. Fig. 2C is designed so that the connection established through the linefinder will not be interrupted even during the normally busy periods unless an operator chooses to render the timing feature operative or unless actual traffic conditions warrant disconnection. The major part of the time allowed by the timing device will be marked off during the normally busy period but the timing device will cease operating, after the expiration of the marked time period, until an operator renders it operative or traffic becomes heavy at which time the timing device will operate to mark the short time remaining to thereby quickly time out and interrupt the connection. More specifically, if the call is made during a normally busy period, cam springs 241 and 242 will be closed. When relay 130 operates on answer by the called party, the circuit is closed from ground through cam springs 221, 242 and 210, shaft springs 155, and contacts 161 and 132 to the motor magnet 205. Motor magnet 205 operates and releases as previously explained to step the cams 201 to 204 inclusive, the first step causing the pulsing circuit from cam springs 221 to be transferred from the circuit through cam springs 242 and 210 to the circuit through cam springs 211. The cams continue to step until cam 202 closes the circuit to relay 160 from ground at contacts 246 to be closed at cam springs 213, assuming relay 245 to be unoperated. Relay 160 operates and opens a point at contacts 161 in the pulsing circuit to the motor magnet 205. The cams 201 to 204 inclusive cease stepping and the connection through the linefinder is left undisturbed until the parties voluntarily release the connection or until the operator closes ground to relay 245 by way of the manual key 229, if local, or the switch train 225, stepping switch 226 and operating relay 227, in case the operator is at a distant point, or until an actual heavy traffic condition causes operation of relay 235. This control is given to the operator so that if light traffic conditions do not warrant disconnection of the call during the normally busy hours, the operator has the means of controlling the disconnect feature. The operator, if she desires to interrupt the connection, operates the key 229 or dials over the switch train 225 to step the switch 226 to the sixth bank contact. Ground is closed over the wiper and sixth bank contact to the upper winding of differential relay 227. Relay 227 operates, closes a holding circuit to its upper winding, closes its lower winding to the seventh contact of switch 226, and closes ground to relay 245 at contacts 228. Relay 227 will hold operated on its upper winding and the distant operator may subsequently release the switch train 225 and return the stepping switch 226 to normal. If the conversation timing feature is under the control of actual traffic conditions in the exchange, the automatic closing of ground at contacts 236 in a well known manner during heavy traffic periods will cause relay 235 to operate to close ground to relay 245 at contacts 237. In any case, relay 245 operates, locks up to ground through cam springs 241 by way of contacts 247 to insure that the timing feature will not be interrupted in case the operator or a light traffic load subsequently opens the original operating circuit to relay 245, and opens the circuit to relay 160 at contacts 246. Relay 160 restores and recloses the impulsing circuit to the motor magnet 205. The motor magnet 205 operates to take the few steps remaining to cause the warning tone to be placed on the line by cam 203 and the holding circuit including conductor 169 to be opened by cam 204 to cause the connection to be released as described above, the stepping mechanism or timer 200 returning to its normal position as described.

Relay 245, once operated, will remain operated as long as the normally busy period, designated by cam 240, continues, the locking ground being closed through cam springs 241 and all subsequent calls made during the normally busy period will be timed out in the normal manner without any ceasing of timing. It should be noted that complete control of the timing device of Fig. 2C could be given to the operator or the actual traffic conditions by omitting the locking circuit through cam springs 241 so that relay 245 would be operated and released at will. To open the original operating circuit to relay 245 when control is by an operator in a distant office, the operator dials over the switch train 225 to step the switch 226 to the seventh contact. Ground is closed over the wiper of switch 226 and the seventh contact to the lower winding of relay 227. The flux set up by the lower winding of relay 227 opposes the flux set up by the upper winding and relay 227 restores to open the circuit to relay 245 at contacts 228. The relay will remain released when the operator releases the switch train 225 and the switch 226 returns to normal.

If Fig. 2D is used, the timing feature in no way depends on any "normally busy periods of the day." The conversation timing is placed under the control of the local operator by means of the manual key 229 or the distant operator by means of the switch train 225 or under the control of the actual traffic condition of the exchange by means of relay 235. In any case, relay 250 may be operated at any time to close the ground impulses at cam 220 through contacts 251 to start the timer 200. The impulsing circuit will transfer to cam springs 211 on the first steps and the timer 200 will continue to operate, even if relay 250 subsequently restores, until the connection has been released.

If Fig. 2E is employed, the timer 200 will be rendered operative only during normally busy periods of the day when cam 260 has closed cam springs 261 and then only when contacts 263 have been closed by the operation of relay 262 due to the operation of key 229 or the operation of relays 227 or 235 as under conditions previously described. Thus, the connection will be interrupted only during certain normally busy periods of the day and then only when an operator desires to have the connection interrupted or when actual traffic conditions warrant interruption. Once the timer 200 starts, it will continue operation independent of cam 260 and relay 262 as previously explained.

Fig. 2F discloses a means whereby the timer 200 would be rendered operative in all cases during the normally busy periods of the day by the closing of cam springs 271 by cam 270 and could also be rendered operative during any other period of the day by the closing of contacts 273 by operation of relay 272, operation of relay 272 being under control of the local or distant operator or the actual traffic conditions of the system as previously described.

It might be desirable to subject only inter-office calls from certain subscribers' lines to conversation timing, leaving inter-office calls from other subscribers' lines and intra-office calls from all subscribers' lines free to remain for any length of time, in which case the conversation timing equipment would have to be located in the repeater circuits and a means provided for signaling the repeater when the call is being made from said certain subscribers' lines. Such a system is shown in Fig. 3 taken in conjunction with Fig. 2. Fig. 3 discloses a finder 300, selector 304, and distributor 303 for establishing intra-office and inter-office connections, and a repeater 380 for establishing inter-office connections. Fig. 2 in this instance is a part of the repeater 380 and provides the means for timing the inter-office connections having conversation timing. The finder 300 of Fig. 3 operates in a manner very similar to the finder 100 of Fig. 1, components in Fig. 3 which are similar to certain components in Fig. 1 having designation numbers with the tens and units digits the same.

The finder 300 is designed so that certain lines accessible to the finder will have the conversation timing while the others will have uninterrupted service. If all the lines accessible to the finder 300 are to have conversation timing, the "S" wiring is used and the shaft springs 355, "Y" wiring, extra bank contact 334, wiper 335, and "X" wiring are omitted from the circuit. If the finder is to serve lines of which only certain lines have conversation timing and the discrimination is to be made on the basis of switch bank levels, shaft springs 355 and wiring "Y" is used while extra bank contact 334, wiper 335, "X" wiring, and "S" wiring are omitted, or if the discrimination is to be made on a line basis, the extra bank contact 334 and wiper 335 and "X" wiring are used while shaft springs 355, "Y" wiring, and "S" wiring are omitted. For a better understanding of the principle of these discrimination methods, reference may be had to the above mentioned co-pending application showing somewhat similar means for discriminating between the lines to have the conversation timing and those not having conversation timing. When using the shaft springs 355, they are arranged to close on the bank levels on which lines having conversation timing terminate and to remain open on levels on which lines not having conversation timing terminate. For instance, if line 301 is to have conversation timing and line 306 is not subject to conversation timing, the shaft springs will close on the bank level on which line 301 is terminated and will remain open on the bank level on which line 306 is terminated.

When "X" wiring and associated apparatus is used, the fourth bank contact terminating each line in the banks, for example, contact 334, is connected directly to ground on lines having conversation timing and is left open on lines not having conversation timing. It can then be seen that if the finder is connected to a line subject to conversation timing, the conductor 363 leading to the selector circuit 304 is grounded at some time in the operation of finder 300. This will cause relay 330 to operate to start the timer on an inter-office call through the repeater when the called subscriber answers and relay 384 operates. If the call is not an inter-office call over the repeater 380, the ground on conductor 363 will have no effect on the subsequent switch train and it can be easily seen that intra-office calls will not be effected.

Describing the operation of the system of Fig. 3 more particularly, when the calling subscriber at substation B initiates a call, ground on conductor 309 initiates operation of the distributor 303 in a manner similar to that described for the operation of distributor 103, start relay 310 operating. Relay 310 closes the line loop at contacts 311 to seize the selector 304 and also closes the circuits of the vertical and rotary magnets 320 and 325, respectively, to the distributor 303, the vertical and rotary magnets subsequently operating to step the finder 300 to locate the calling line 301. After the finder locates the calling line and the distributor is subsequently released to be used by other finder circuits in the same group, the selector 304 responds to dial pulses over the line loop from the calling line 301 in a well known manner to locate a repeater accessible from the selector 304. Assuming that the selector 304 locates repeater 380 which at the time had been idle, the line loop is closed from the calling line 301, through the selector 304, to relay 390 over line conductors 381 and 382 and through two windings of the repeater coil 397 in a well known manner. Relay 390 operates, closes the line conductor 398 at contacts 391 to seize the following switch in the switch train, represented by 319, to the calling subscriber, the line loop being closed through the two left hand windings of the repeat coil in series with the upper winding of electro-polar relay 384, and closes the circuit to relay 393 at contacts 392.

Relay 393 operates, grounds conductor 383 through cam springs 215 at contacts 395 to hold the preceding switch train under control of the repeater 380, and closes the circuit to the lower or polar winding of electro-polar relay 384 at contacts 396. At this time, the upper or operating winding of electro-polar relay 384 opposes the lower winding and electro-polar relay 384 will not operate, relay 384 only operating when the called party answers and the subsequent switch train reverses battery potential back on the line conductors 398 and 399 in a well known manner. Relay 390 will follow the subsequent dial impulses from the calling subscriber line 301, opening and closing the line loop to the subsequent switch train at contacts 391 to set up a connection to a subscriber line or toll position. Relay 393 is a slow-to-release relay and will not release during the pulsing of relay 390. Assuming the call is to a subscriber line, and when the called party answers the call, battery potential is reversed on the line conductors 398 and 399 to the upper winding of electro-polar relay 384 in a well known manner. The upper winding of electro-polar relay 384 now aids the lower winding and electro-polar relay 384 operates to reverse the battery potential through relay 390 on line conductors 381 and 382 for supervision in selector 304, and connects relay 330 to selector 304 at contacts 389. If the call is from a calling line which is not to have conversation timing, there will be no ground on conductor 363 in selector 304 and relay 330 will remain unoperated. On the other hand, if the call is from a line which is to have conversation timing, ground will be standing on conductor 363 and relay 330 will operate, closing a holding circuit to itself from ground at contacts 396 through contacts 331. Relay 330 on operating also closes the circuit to motor magnet 205 from the various control devices Figs. 2B to 2F inclusive at contacts 332. It will be noted that relay 330 of Fig. 3 performs the same functions as relay 130 in Fig. 1. Figs. 2 and 2A, in conjunction with any of the Figs. 2B to 2F inclusive, operate in the exact same manner to interrupt a connection established through the finder 300 and repeater 380 as described above for interrupting a connection through finder 100 of Fig. 1. In this case when cam 204 opens cam springs 215 at the end of the allowed conversation time, the ground at contacts 395 is removed from conductor 383 to selector 304. Selector 304, which was being held by the ground on conductor 363, releases, opening the line loop to relay 390 which then restores to cause the repeater circuit 380 to return to normal, and also removes ground from conductor 369 to release relay 340 which causes the finder 300 to return to normal in the same manner as finder 100 of Fig. 1 returned to normal on the restoration of relay 140.

On calls to a toll position, there will be no reversal of battery on the line conductors when the toll operator answers and relay 384 will not operate to start the timing equipment.

Having described a preferred embodiment of the invention, it is to be understood that various modifications may be made therein, and the appended claims are intended to cover all such modifications as fall within the true spirit and scope of the invention.

What is claimed is:

1. For use in a telephone system having a plurality of groups of calling lines and a plurality of groups of called lines, a linefinder having access to said plurality of groups of calling lines, a repeater circuit accessible from said linefinder circuit, means for establishing a connection between any one line of said groups of calling lines and any one line of said groups of called lines through said linefinder and said repeater, restricting means in said repeater operative to impose a time restriction on the use of said linefinder and repeater, circuit means in said linefinder operative to cause operation of said restricting means, means whereby said last means is operated only on connections established from lines in one of said groups of calling lines said restricting means being inoperative on connections established from lines in another of said groups of calling lines, and means in said repeater for rendering said restricting means inoperative, and means whereby said last means is operated on a connection established from a line in said one group of calling lines to a line in a certain one group of said groups of called lines.

2. In a telephone system comprising a plurality of groups of calling lines and a plurality of groups of called lines, a linefinder circuit having access to said plurality of groups of calling lines, a repeater circuit accessible from said linefinder circuit, means for establishing a talking connection between any one line of said groups of calling lines and any one line of said groups of called lines through said linefinder and repeater circuits, interrupting means in said repeater circuit operative to interrupt the talking connection established therethrough, a timer device for measuring a length of time, means controlled by said timer device and operated thereby a certain period of time after the establishment of a connection to cause operation of said interrupting means, discriminating means operated only on connection of said linefinder to calling lines in a certain one of said groups of calling lines, circuit means controlling said interrupting means and operated by operation of said discriminating means to cause operation of said interrupting means, said interrupting means remaining unoperated on talking connections established from lines in another of said groups of calling lines, and means in said repeater for rendering said interrupting means inoperative on a talking connection established from a line in said one group of calling lines to a line in a certain one of said groups of called lines.

3. In a telephone system having a plurality of groups of calling subscriber's lines, a linefinder having access to said calling lines, a trunk circuit accessible from said linefinder for establishing a connection between any one of said lines in said groups of calling lines and any one line in a plurality of groups of called lines, signalling means in said linefinder for transmitting a signal to said trunk circuit only in case the call is from a calling line in a certain one of said groups of calling lines, conversation timing equipment in said trunk circuit arranged to cause the established connection to be interrupted a certain time period after energization of said timing equipment, first circuit means in said trunk, means for operating said first circuit means in response to the answer of a call by a called line only in case the called line is in a certain one of said groups of called lines, and a second circuit means in said trunk circuit operated by said signal and in response to the operation of said first circuit means for energizing said conversation timing equipment to thereby cause interruption of the connection only on calls from calling lines in said certain one of said groups of calling lines to called lines in said certain one of said groups of called lines.

4. For use in a telephone system having a calling line and a called line and means for establishing a talking circuit therebetween, means operative to automatically interrupt said talking circuit, a timer device operative in response to a plurality of signals to cause operation of said means to automatically disconnect said talking circuit, an impulsing means for transmitting a plurality of timed signals to said timer device a clock device for keeping the time of the day, a circuit operated by said clock device only during a certain time period of the day, a first signaling circuit including said operated circuit for transmitting a first one of said signals to said timer device to cause initial operation thereof, and a second signaling circuit for transmitting the remaining signals to said timer device established in response to said initial operation of said timer device and independent of said circuit.

5. For use in a telephone system having a calling line and a called line and circuit means for establishing a talking connection therebetween, means operative to automatically disconnect said talking connection, a stepping switch having a normal position and an advanced position and operative in response to the receipt of a plurality of signals to step from said normal position to said advanced position, a timer device, means operated by said timer device to produce a plurality of time spaced signals, a clock device running in accordance with the time of the day, a pair of contacts operated by said clock device only during a certain predetermined time period of the day, relay means operated on the establishment of a talking connection, a first circuit comprising said operated pair of contacts and closed by the operation of said relay means for transmitting a first one of said plurality of signals to said stepping switch to step said switch off said normal position, a second pair of contacts operated in response to the movement of said switch off said normal position, a second circuit comprising said operated second pair of contacts for transmitting the remainder of said signals to said stepping switch independent of said first circuit to step said switch to said advanced position, and circuit means operated responsive to said switch in said advanced position to operate said means to automatically disconnect said talking connection.

6. For use in a telephone system having a calling line and a called line and circuit means for establishing a connection therebetween, means operative to automatically disconnect said connection, a timer device operative in response to the receipt of a plurality of signals to cause operation of said means to automatically disconnect said connection, an impulsing means for transmitting a plurality of time spaced signals to said timer device, a first signaling circuit, means controlled by said circuit means and operated on completion of said connection for operating said first signaling circuit to cause transmission of a first one of said signals to said timer device to cause initial operation thereof, and a second signaling circuit operated in response to the initial operation of said timer device to cause transmission of the remaining signals to said timer device independent of said first signaling circuit.

7. For use in a telephone system having a calling line and a called line and circuit means for establishing a talking connection therebetween, means operative to automatically disconnect said talking connection, a stepping switch having a normal position and an advanced position and operative in response to the receipt of a plurality of signals to step from said normal position to said advanced position, a timer device, means operated by said timer device to produce a plurality of time spaced signals, relay means operated on the establishment of a talking connection, a first circuit operated in response to the operation of said relay means for transmitting a first one of said plurality of signals to said stepping switch to step said switch off said normal position, a pair of contacts operated in response to the movement of said switch off said normal position, a second circuit comprising said operated pair of contacts for transmitting the remainder of said signals to said stepping switch independent of said first circuit to step said switch to said advanced position, and circuit means operated responsive to said switch in said advanced position to operate said means to automatically disconnect said talking connection.

8. For use in a telephone system having a calling line and a called line and means for establishing a connection therebetween, means operative to automatically interrupt said connection, a clock device running in accordance with the time-of-the-day, a first circuit closed by said clock device only during a certain predetermined time of the day, a timer device operated responsive to the closure of said first circuit and having a certain time period of operation, circuit means energized by said timer device before the expiration of said certain time period of operation for opening said first circuit, means for deenergizing said circuit means to cause reclosing of said first circuit, a second circuit for operating said deenergizing means, a third circuit controlled by said operated deenergizing means and by said clock device for holding said deenergizing means operated until the end of said certain predetermined time of the day, and a second circuit means operated by said timer device at the expiration of said certain time period of operation for operating said means to automatically interrupt said connection.

9. For use in a telephone system having a calling line and a called line and means for establishing a connection therebetween, means operative to automatically disconnect said connection, a stepping switch having a normal position, a first advanced position and a second advanced position and operative in response to the receipt of a first plurality of signals to step from said normal position to said first advanced position and to the receipt of a second plurality of signals to step from said first advanced position to said second advanced position, a timer device, means operated by said timer device to produce a plurality of time spaced signals, relay means operated on the establishment of said connection, a circuit completed in response to the operation of said relay means for transmitting said first plurality of signals to said stepping switch to step said switch from said normal position to said first advanced position, circuit means operated responsive to the stepping of said switch to said first advanced position to open said signal transmitting circuit to cause said switch to cease stepping, second circuit means controlling said first circuit means, means for operating said second circuit means to disable said first circuit means to thereby close said signal transmitting circuit to cause said switch to receive said second plurality of signals and step from said first advanced position to said second advanced position, and third circuit means operated responsive to said switch in said second advanced position to operate said means to automatically disconnect said connection.

10. For use in a telephone system having a calling line and a called line and means for establishing a talking circuit therebetween, means operative to automatically disconnect said talking circuit, a stepping switch having a normal position, a first advanced position and a second advanced position and operative in response to the receipt of a first plurality of signals to step from said normal position to said first advanced position and to the receipt of a second plurality of signals to step from said first advanced position to said second advanced position, a timer device, means operated by said clock device to produce a plurality of time spaced signals, a pair of contacts, means for closing said pair of contacts only during a certain predetermined time period of the day, relay means operated on the establishment of said talking circuit, a first circuit comprising said operated pair of contacts and closed by the operation of said relay means for transmitting a first one of said first plurality of timed signals to said stepping switch to cause said switch to step off said normal position, a second pair of contacts operated in response to the movement of said switch off said normal position, a second circuit comprising said operated second pair of contacts for transmitting the remainder of said first plurality of signals to said stepping switch independent of said first circuit to step said switch to said first advanced position, circuit means responsive to the stepping of said switch to said first advanced position to open the signal transmitting circuits to said switch to cause it to cease stepping, second circuit means for disabling said first circuit means, means for operating said second circuit means only under certain conditions to disable said first circuit means to thereby close the signal transmitting circuits to said switch to cause said switch to receive said second plurality of signals and step from said first advanced position to said second advanced position, and third circuit means operated responsive to said switch in said second advanced position to operate said means to automatically disconnect said talking circuit.

11. In a telephone system as claimed in claim 10, a third pair of contacts, means for operating said third pair of contacts only during said certain predetermined time period of the day, and a holding circuit comprising said third pair of contacts completed on operation of said second circuit means to thereby hold said first circuit means disabled until the end of said predetermined time period.

12. For use in a telephone system having a calling line and means for establishing a called line and a connection therebetween, means operative to automatically interrupt said connection, a relay, means for operating said relay in one instance under control of an operator and in another instance in response to traffic conditions in said system, a timer device for producing time spaced signals, circuit means, a first signal transmitting circuit closed by the operation of said relay to transmit one of said timed signals to said circuit means, a second signal transmitting circuit for transmitting a plurality of said timed signals to said circuit means independent of said first signal transmitting circuit, means operated by said circuit means after the receipt of a first one of said plurality of signals for closing said second signal transmitting circuit, and means operated by said circuit means responsive to said plurality of signals to operate said interrupting means.

13. For use in a telephone system having a calling and called line and means for establishing a connection therebetween, means for interrupting said connection, a clock device running in accordance with the time-of-day, first circuit means operated by said clock device only during a certain predetermined time of the day, second circuit means, means for operating said second circuit means in one instance under control of an operator and in another instance in response to traffic conditions in said system, a timer device operative a certain period of time after initial operation thereof to cause operation of said interrupting means, and a circuit completed only on the operation of said first and said second circuit means to cause operation of said timer device.

14. For use in a telephone system having a calling line and a called line and means for establishing a connection therebetween, means for interrupting said connection, a clock device running in accordance with the time-of-day, first circuit means operated by said clock device only during a certain predetermined time of the day, second circuit means, means for operating said second circuit means in one instance under control of an operator and in another instance responsive to traffic conditions in the system, a timer device operative a certain period of time after initial operation thereof to cause operation of said interrupting means, a first circuit completed only on the operation of said first and said second circuit means to cause operation of said timer device, and a second circuit completed on the initial operation of said timer device and independent of said first circuit to cause subsequent operation of said timer device.

15. For use in a telephone system having a calling line and a called line and means for establishing a connection therebetween, means for interrupting said connection, a clock device running in accordance with the time-of-day, first circuit means operated by said clock device only during a certain predetermined time of the day, second circuit means, means for operating said second circuit means in one instance under control of an operator and in another instance responsive to traffic conditions in said system, a timer device operative a certain period of time after initial operation thereof to cause operation of said interrupting means, a first circuit completed only on the operation of said first circuit means to cause initial operation of said timer device in one instance, a second circuit completed only on the operation of said second circuit means to cause initial operation of said timer device in another instance, and a third circuit completed on the initial operation of said timer device and independent of said first and second circuits to cause subsequent operation of said timer device.

16. In a telephone system having means for establishing a talking connection, a control device associated with said connection for disconnecting the same, a timing unit operative for a certain time period after its initial operation, said unit being effective to actuate said device after the lapse of said period, a clock device running in accordance with the time-of-the-day, means controlled by said clock device for initially operating said timing unit only during a certain period of the day, means effective under certain traffic conditions in the system for disabling said timing unit after it has operated for a certain portion of said time period, other means for causing said timing unit to operate for the remaining portion of said certain time period, means for operating said other means, and means whereby said last means is operated in response to a change in traffic conditions.

17. In a telephone system having means for establishing a talking connection, a timing unit, a device associated with said connection for disconnecting the same, a clock means running in accordance with the time-of-the-day, means controlled by said clock means for rendering said timing unit effective to control said device only during a certain period of time, means effective under certain traffic conditions in the system for preventing said timing unit from controlling said device during a portion of said period, other means for preventing said last means from affecting the control of the unit over said device, means for operating said other means, and means whereby said last means is operated responsive to a change in traffic conditions during said period.

CLARENCE E. LOMAX.

References Cited in the file of this patent

UNITED STATES PATENTS

| Number | Name | Date |
|---|---|---|
| 2,333,039 | Peterson | Oct. 26, 1943 |